March 5, 1940.  F. W. FALTERMAYER  2,192,731
SPEED CHANGE DEVICE
Filed July 29, 1938  6 Sheets-Sheet 1

INVENTOR
Frederick W. Faltermayer
BY
Leonard L. Kalish
ATTORNEY

March 5, 1940.　　F. W. FALTERMAYER　　2,192,731
SPEED CHANGE DEVICE
Filed July 29, 1938　　6 Sheets-Sheet 2

INVENTOR
Frederick W. Faltermayer
BY Leonard L. Kalish
ATTORNEY

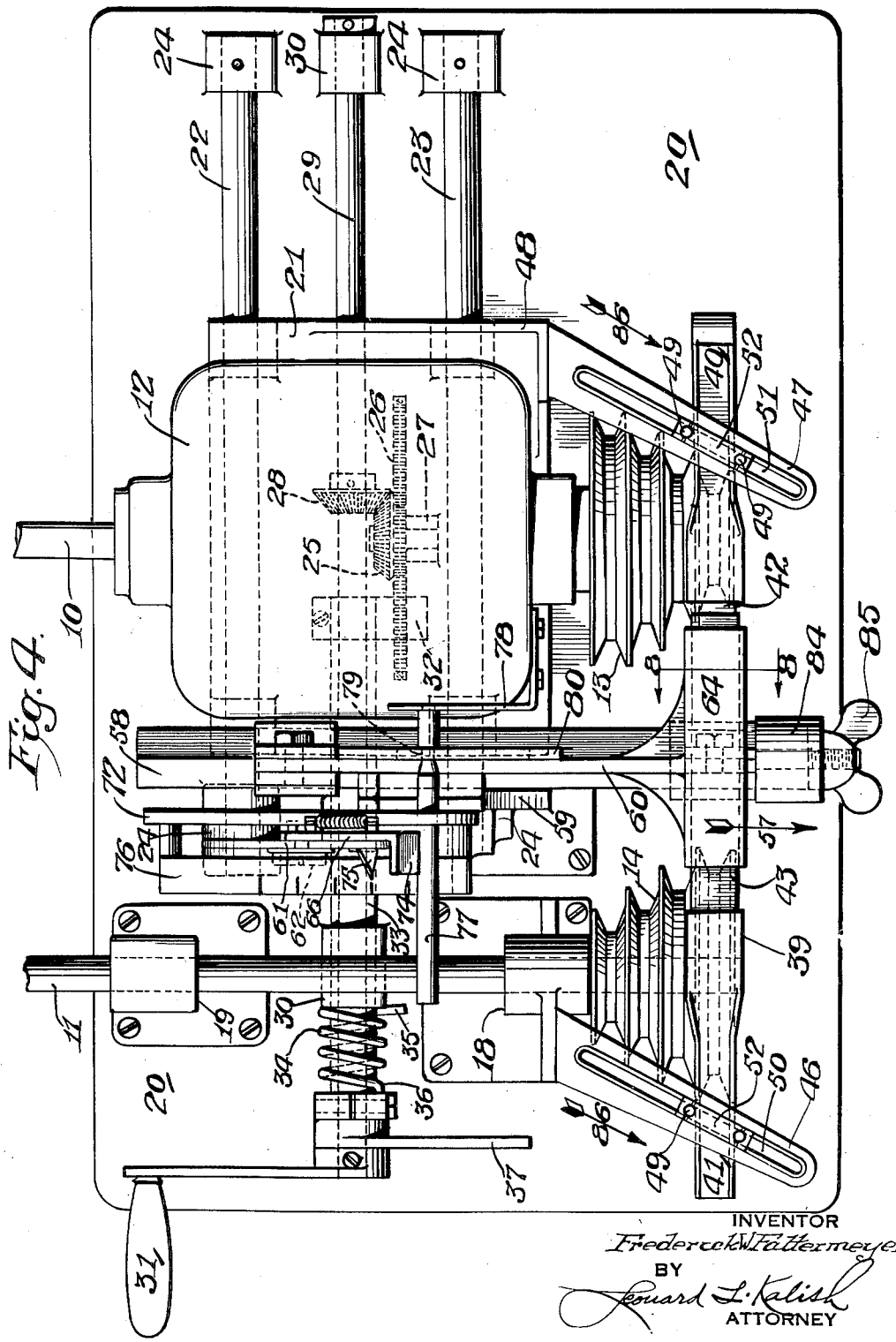

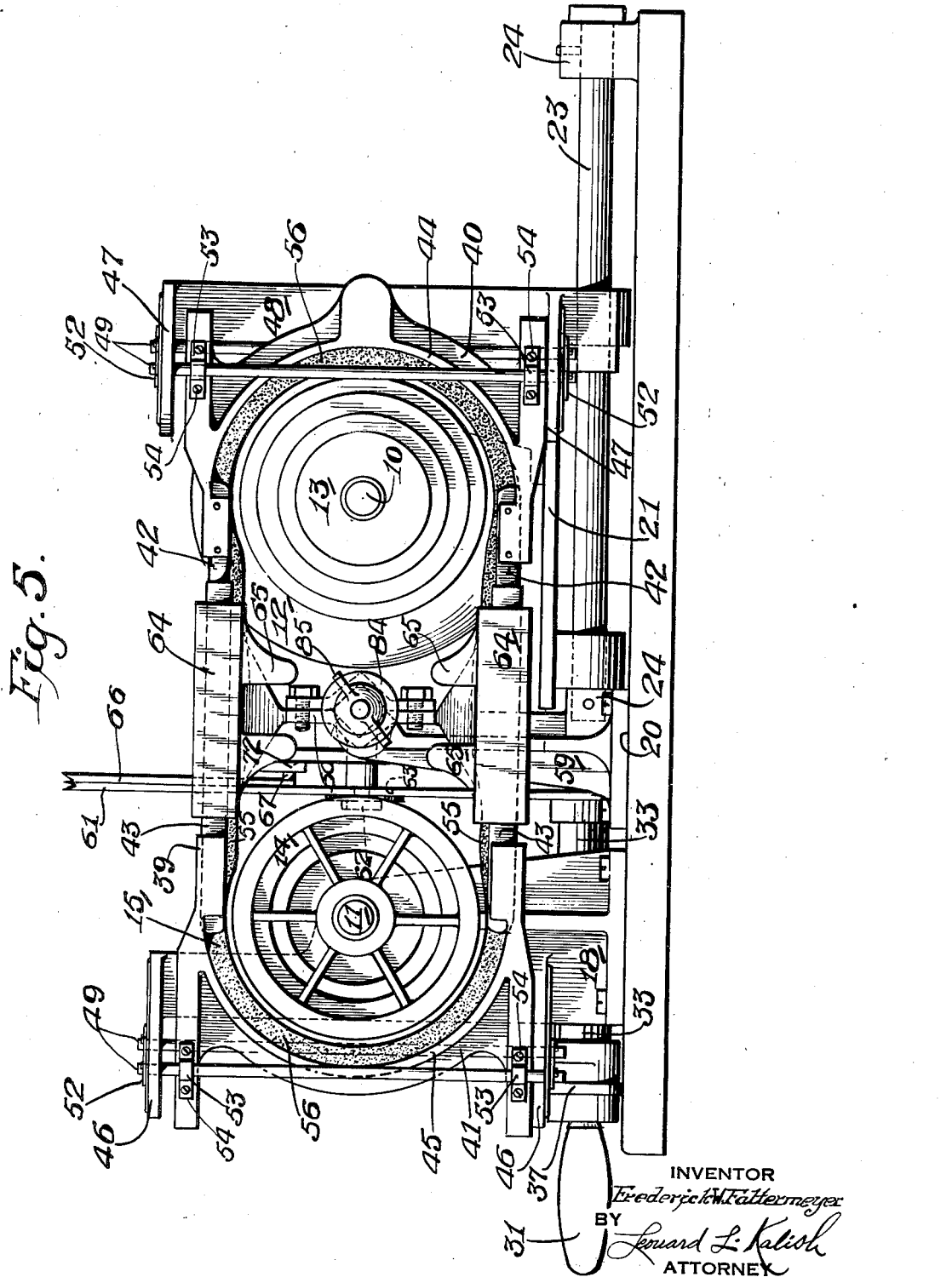

March 5, 1940. F. W. FALTERMAYER 2,192,731
SPEED CHANGE DEVICE
Filed July 29, 1938 6 Sheets-Sheet 5
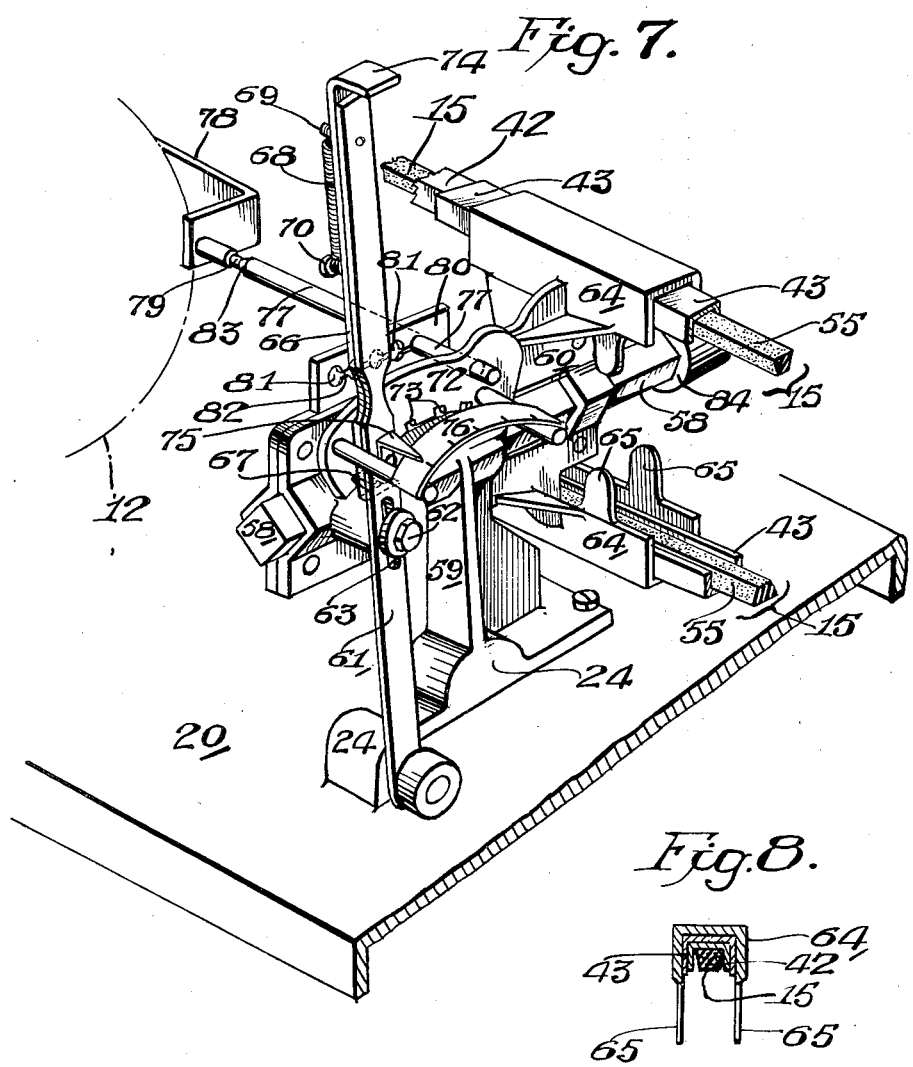
INVENTOR
Frederick W. Faltermayer
BY
Leonard L. Kalish
ATTORNEY Patented Mar. 5, 1940

2,192,731

UNITED STATES PATENT OFFICE 2,192,731

SPEED CHANGE DEVICE

Frederick W. Faltermayer, Philadelphia, Pa.

Application July 29, 1938, Serial No. 221,949

20 Claims. (Cl. 74—242.3)

The present invention relates to a speed change device, and it relates more particularly to a speed change device wherein the angular velocity ratio between driving member and driven member may be quickly varied to predetermined values.

An object of the present invention is to provide an efficient and readily adjustable speed change device useful in transmitting power between rotating shafts, and particularly useful as a generally integral part of machine tools, such as lathes, drill presses, milling machines, and production machinery of all kinds, wherein predetermined varying operating speeds are required.

Another object of the present invention is to provide a quickly adjustable gearless speed change device utilizing endless V or flat belts in association with stepped-cone pulleys, wherein variations in velocity ratio may be quickly effected, and without requiring stoppage of the driving member.

Another object of the present invention is to provide a speed change device employing an endless belt associated with stepped-cone pulleys, wherein the belt may be transferred from any pair of cooperating pulley stages to any other pair of cooperating pulley stages without contacting the intermediate pulley stages which may lie therebetween.

Another object of the present invention is to provide a readily adjustable mechanism which may function either as a speed-change device or as a clutch arrangement, at the will of the operator.

Another object of the present invention is to provide a speed change device adapted to transfer jointly a plurality of parallel belts from one cooperating pair of stepped-cone pulley stages to any other cooperating pair of stepped-cone pulley stages.

Another object of the present invention is to provide a speed change device employing one or more endless belts in association with relatively transversely movable stepped-cone pulleys, wherein the belt or belts may be transferred from one pulley stage to another along a path generally parallel to the slope of the cone pulleys thereby to minimize the required transverse movement of the pulleys and to reduce the required length of belting.

Another object of the present invention is to provide a speed change device having one or more endless belts associated with stepped-cone pulleys wherein the belt or belts may be quickly and easily removed from the device, for inspection or replacement purposes.

With the above and other objects in view which will appear more fully from the following detailed description and accompanying drawings, the present invention comprises a speed change device including two transversely aligned stepped-cone pulleys, said pulleys being relatively movable in a transverse direction, a belt, V type or otherwise, adapted selectively to interconnect each cooperating pair of stages of said stepped-cone pulleys, and means for shifting said belt from the common plane of any one of said cooperating pairs of pulley stages to the common plane of any other cooperating pair, said means being operable only when said pulleys have been moved toward each other.

The present invention may further include means for shifting said belt beyond the common plane of the last cooperating pulley stages of said stepped-cone pulleys, thereby to facilitate the removal of the belt from said speed change device.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring to the drawings in which like reference characters indicate like parts:

Figure 4 represents a plan view of the speed change device at the stage shown in Figure 3.

Figure 5 represents an elevational view of the pulley side of the device illustrated in Figures 3 and 4.

Figure 7 represents a fragmentary perspective view of the lever-controlled belt-shifting means provided on the device illustrated in the preceding figures.

Figure 8 represents a fragmentary sectional view taken on line 8—8 of Figure 4, looking in the direction of the arrows.

Figure 6:
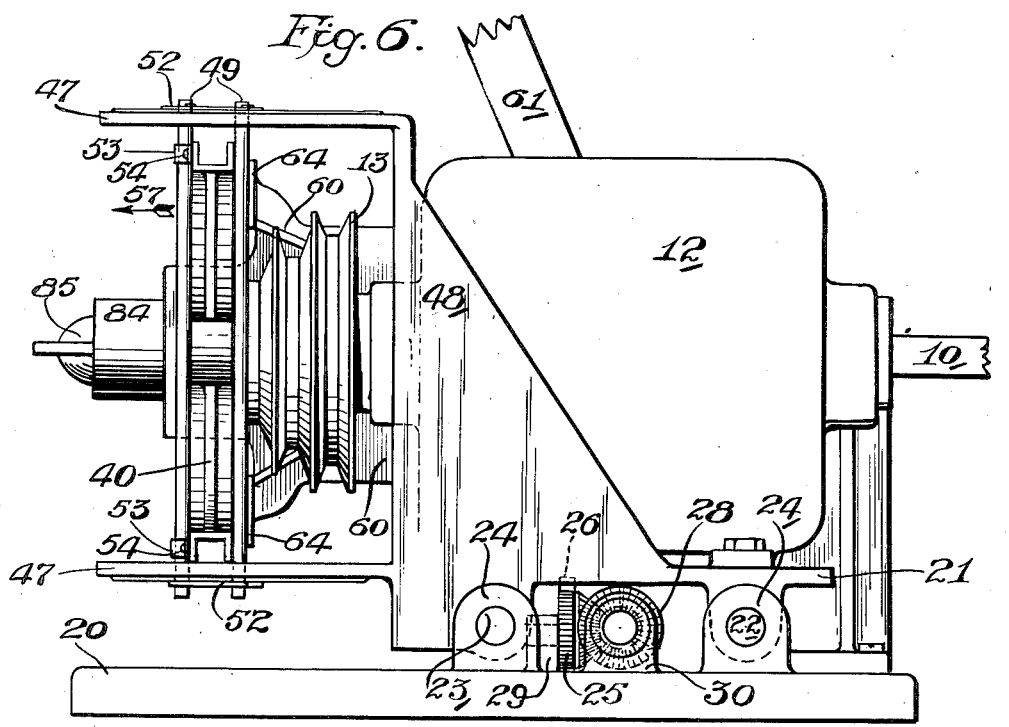
Figure 6 represents an end elevational view of this same device.
Figure 1:
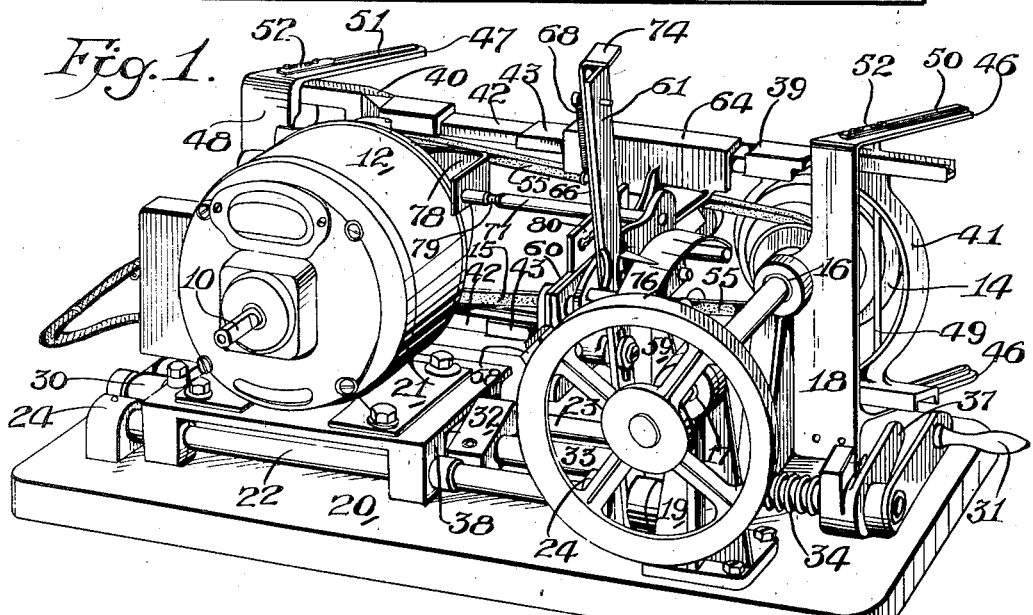
Figure 1 represents a side perspective view of a speed change device constituting one embodiment of the present invention.
Figure 3:
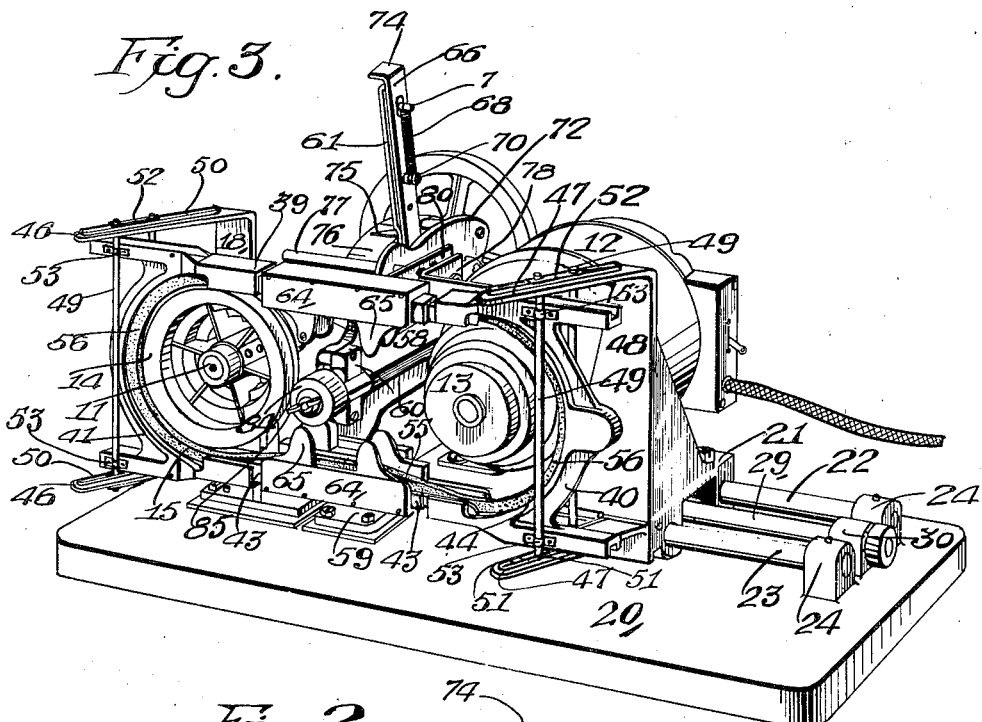
Figure 3 represents a view similar to that shown in Figure 2, but shows the belt pulleys moved together and the endless belt shifted to the plane of a different pair of pulley stages.
Figure 2:
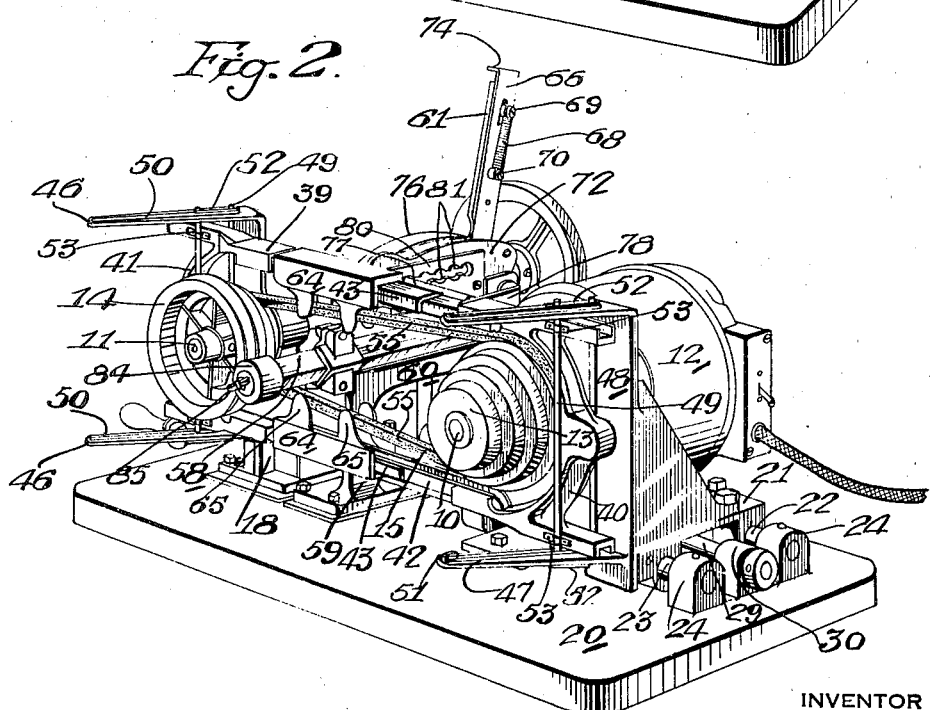
Figure 2 represents a perspective view of the speed change device illustrated in Figure 1 when viewed from the opposite side thereof.

The particular embodiment of the present invention illustrated in the accompanying drawings is to be considered merely illustrative, and the details thereof may be widely varied without departing from the scope of the present invention. Thus, for example, the character and specific location of the various parts may be widely varied without departing from the spirit of the present invention.

The speed change device illustrated in the accompanying drawings may be applied, with or without modification, to a multitude of machine tools, such as lathes, drill presses and the like, wherein varying operating speeds are required. Shafts 10 and 11 may be considered the parallel spaced shafts commonly embodied in such machines;—one of said shafts constituting the driving member and the other constituting the driven member.

Any suitable prime-mover, such as the electric motor 12 may be directly associated with driving shaft 10. However, it is to be expressly understood that this prime mover may be directly associated with either one of the two shafts 10 and 11, and indeed may even be indirectly associated therewith by means of gearing, belt and pulley arrangements, or the like.

Shafts 10 and 11 are each respectively provided with juxtaposed stepped-cone pulleys 13 and 14, each firmly secured to these shafts with their apices oppositely disposed, and with their successive stages or steps lying in common planes, all in the well-known manner.

Although the particular stepped-cone pulleys 13 and 14 illustrated in the drawings each includes four steps or stages, it is to be understood that this number may be varied, and that more or less stages may be provided, depending upon the specific commercial application of the speed change device. The multi-stage stepped-cone pulleys 13 and 14 illustrated in the drawings each may be constructed in one piece with the successive differently diametered stages or steps cast or otherwise formed integrally with each other, or these pulleys each may be built up from a plurality of separate, differently-diametered pulleys generally permanently joined together to provide the composite stepped-cone arrangement illustrated in the drawings.

An endless belt 15 is preferably provided, said belt being adapted selectively to contact each cooperating pair of pulley steps or stages, from the pair including the largest-diametered stage on the driving pulley 13 and the coplanar smallest-diametered stage on the driven pulley 14, to the pair including the smallest-diametered stage on the driving pulley 13 and the coplanar largest-diametered stage on the driven pulley 14.

The endless belt 15 may be of the V type shown (i. e. triangular or trapezoidal in cross-section), in which case the pulley stages are correspondingly grooved to receive the belt, as illustrated in the drawings, or this belt may be a "flat" belt (i. e. generally rectangular in cross-section), in which case the surfaces of the pulley stages may be generally cylindrical in shape, and perhaps slightly crowned, in the well-known manner. The present invention is particularly adapted for use with V type belts which, although of greater capacity and more efficient than corresponding "flat" belts, yet present greater problems in being shifted from one pulley stage to another. However, in lieu of the V belt 15 illustrated, the speed change device may employ solely a "flat" belt, preferably of the character described in greater detail hereinafter.

Driven shaft 11 may be rotatably journalled in axially spaced bearings 16 and 17 inserted in the fixed shaft supports 18 and 19 respectively. These, as well as all other fixed supports, may be either formed integrally with the base 20, or they may be formed separately therefrom and connected thereto in any suitable fashion, as for instance by being bolted or otherwise anchored thereto.

Driving shaft 10, which may form an integral part of the electric motor 12, is preferably transversely movable relative to driven shaft 11. If desired, however, the driving shaft 10 may be fixed and the driven shaft 11 may be movable, or indeed both shafts may be movable. In any event, provision is made to decrease the distance between the stepped-cone pulleys 13 and 14 sufficiently to permit the endless belt 15 to be shifted or transferred without hindrance from one cooperating pair of pulley stages to any other cooperating pair.

In the illustrated embodiment, the electric motor 12 and associated pulley 13 are mounted on a transversely-movable carriage 21 slidably mounted on spaced parallel guide rods 22 and 23. These guide rods may be supported at their opposite ends in base-lugs 24, 24 which may be formed integrally with the base 20.

Transverse movement of the motor carriage 21, and therefore the driving pulley 13, may be effected and controlled by means of a rack and pinion arrangement, such as that illustrated more particularly in Figures 4 and 6. Thus, a pinion gear 25, in mesh with the rack 26 provided on the underside of the slidable motor carriage 21, may be journalled in a lug 27 fixedly related to the base 20. The pinion gear 25 may be rotated by means of the meshing bevelled driving gear 28 keyed to the rotatable shaft 29. This shaft 29 is preferably rotatably journalled at opposite ends in the base lugs 30, 30 which project above the surface of base 20. A manually operable crank handle 31, fixedly secured to the end of the rotatable shaft 29, may be provided for turning the driving gear 28. In the preferred embodiment, the gearing is designed so that only a one-half turn of the crank handle 31 is required to move the motor carriage 21 from its one extreme position to the other.

An automatic locking arrangement may be provided to prevent unintended return movement of the driving pulley 13 once it has been separated from the driven pulley 14 to the desired degree, that is to say, when the endless belt 15 is suitably tensioned over these two pulleys.

The particular locking arrangement included in the embodiment of the present invention illustrated in the drawings includes a tiltable locking block 32 connected to one end of a rotatable sleeve 33 coaxially mounted on the rotatable bevel-gear shaft 29. The tiltable block 32 is preferably constantly urged into an upwardly-tilted carriage-obstructing position by a coiled torsion spring 34, the opposite ends 35 and 36 of which bear against the base 20, and the sleeve 33, respectively. A manually operable lock-releasing arm 37 is preferably fixedly secured to the outer end of sleeve 33, and in proximity to the crank handle 31, so that both the lock-release arm and the crank handle may be manipulated by the same hand.

In actual operation, when the lock-release arm 37 is tilted downwardly, the sleeve 33 turns, slightly winding up the coiled torsion spring 34. At the same time, the tiltable carriage-obstructing block 32, disposed at the opposite end of sleeve 33, is swung or tilted downwardly into a non-obstructing position relative to the adjacent end 38 of the slidable motor carriage 21, thus enabling the carriage to slide along its guides and over the downwardly-tilted block upon manual rotation of the crank handle 31. Conversely, when carriage 21 is returned to its original position, operatively tensioning the endless belt 15 over the stepped-cone pulleys 13 and 14, the end 38 of carriage 21 preferably clears and passes beyond the edge of the downwardly-tilted block 32, releasing it. The wound torsion spring 34 accordingly tilts this block upwardly, thus obstructing carriage 21, and preventing any unintended return movement thereof.

According to the present invention, changes in ratio of driving shaft R. P. M. to driven shaft R. P. M may be quickly and easily effected by freeing the endless belt interconnecting these shafts from their respective stepped pulleys, transferring the belt to any desired plane, coincident with the desired pair of cooperating pulley stages, and then re-engaging the belt with the newly-selected pair of cooperating pulley stages.

The present invention contemplates the use of a belt-transfer frame or device for shifting or transferring the belt, when disengaged from the pulleys, to any desired parallel plane.

The belt-transfer frame of the illustrated embodiment, indicated generally by the numeral 39, is preferably somewhat oval-like in contour, as illustrated in Figure 5, and is preferably longitudinally extensible for reasons to be pointed out in greater detail hereinafter. This extensible frame 39 may include the two oppositely disposed generally U-shaped halves 40 and 41, telescopically related to each other along their overlapping parallel leg portions 42, 42 and 43, 43, respectively. These leg portions are preferably trough-like or channel-shaped in cross section. The curved end portions 44 and 45 of these two U-shaped frame halves are preferably generally semi-circular in contour. The height of the belt transfer frame also preferably exceeds the largest diameter of the stepped-cone pulleys by an amount sufficient to permit the endless belt to clear the largest-diametered pulley stage. Furthermore, the channel-shaped leg portions 42 and 43 are preferably of sufficient width to readily accommodate the particular endless belt or belts used with the speed change device.

The ends of the extensible belt-transfer frame 39 may be supported between the vertically-opposed outwardly-projecting arms 46, 46 and 47, 47, respectively. The pair of vertically opposed arms 46, 46 each extend from the stationary or fixed support 18, whereas the opposite pair of vertically opposed arms 47, 47 each extend from the movable support 48, which may be formed integrally with, or connected to, the slidable motor carriage 21.

A pair of spaced vertical rods 49, 49 may straddle each end of the extensible belt-transfer frame 39, and these rods are preferably of sufficient length to extend through and beyond the slots 50 and 51 in the projecting arms 46 and 47, respectively. The protruding upper and lower ends of these rods may be interconnected by means of links 52, 52 which serve to maintain these vertical rods in their correctly spaced relation. At least one of each pair of rods 49, 49 are preferably fixedly related to their respectively adjacent extensible belt-transfer frame halves 40 and 41. Thus, straps 53, 53, secured to the frame by means of the screws 54, or the like, may secure the rods 49, 49 to the adjacent frame halves, or else these rods may be connected to their respective frame ends in any other suitable manner. Accordingly (assuming the belt-transfer frame 39 to be locked against transverse movement), the approach and separation of the driving and driven pulleys 13 and 14 will be accompanied by a corresponding and equal inwardly and outwardly telescoping movement between the two telescoping frame halves 40 and 41;—frame half 41 being held stationary, and frame half 40 moving in synchronism with motor carriage 21 and driving pulley 13.

The pair of rods disposed at each end of the belt-transfer frame may each be replaced by only a single rod, and if desired, these rods may be formed integrally with the belt-transfer frame.

Flat or V belts may be used with the speed change device, but in either case these belts are preferably of sufficient body and stiffness to prevent their collapse when the pulleys have been brought together and the belts contacted by the inner periphery of the inwardly-telescoped frame 39.

A common characteristic of the V type belts is their inherent tendency to expand somewhat, and assume an oval or circular-like shape, when the belt-tension has been released, as for instance when the driving and driven stepped-cone pulleys have been moved together. This tendency of these belts is utilized to assist in guiding the straight portions of the endless belt (i. e. those portions not wrapped around the pulleys) into proper position with respect to the belt-transfer frame when the belt is being disengaged from the pulleys and transferred to the transfer frame.

Thus, when the driving pulley 13 is moved towards the driven pulley 14, relieving the tension in V belt 15, the generally straight portions 55, 55 of said belt tend to bulge apart and recede from each other. Accordingly, these straight portions 55, 55 enter into the trough-like or channel-shaped telescopic leg portions 42 and 43 of the belt-transfer frame 39.

It must be remembered that the transfer-frame 39 telescopes inwardly as the pulleys are brought together, thereby successively decreasing the inner peripheral length of said frame. Since the peripheral length of the endless belt 15 remains generally constant, further decrease in the size of the telescopic belt-transfer frame 39 causes the curved semi-circular end portions 56, 56 or V belt 15 to be guided into intimate contact with the inner periphery of the semi-circular portions of belt-transfer frame halves 40 and 41. By virtue of the trough-like channel-shaped nature of the leg portions 42, 43 of the belt transfer frame halves 40 and 41, lateral movement of the thus inwardly-telescoped frame 39, as for instance in the direction of the arrow 57 of Figure 8, will result in an equal and corresponding lateral movement or translation of the snugly retained belt 15.

Upon subsequent separation of the driving and driven stepped-cone pulleys 13 and 14 (accompanied by a corresponding outwardly-telescoping movement of belt transfer frame halves 40 and 41), the belt 15 is seized by the particular stages or steps of the separating pulleys which lie within the plane of the belt, and is operatively engaged therewith simultaneously with the take-up of the belt slack.

The operation is similar when a flat belt of sufficient body or stiffness is employed.

The speed-change device forming the subject of the present invention also includes readily operable means for transferring the endless belt 15, after it has been disengaged from the pulleys and guided into the transfer-frame 39, from the plane of one pair of pulley stages to that of another. Thus, the belt transfer frame 39 may be moved laterally by any suitable mechanism, as for instance, by means of the lever-controlled arrangement illustrated more particularly in Figure 7. A guide rod of any desired cross-section such as the square rod 58 may be fixedly related to the base 20, through the stationary supporting member 59 which may be either connected to, or formed integrally with, said base. On this guide rod, a carriage 60 is adapted to be manually slid to and fro. The reciprocation of this carriage 60 may be effected in any suitable manner, as for instance, by manual operation of the lever 61, the lower end of which is pivotally related to the base 20 through the lug 24. A bolt, pin or like member 62 fixedly related to the carriage 60 preferably projects through the longitudinal slot 63 in lever 61, thereby interconnecting the lever and the carriage, and transforming the pivoting movement of the lever into a sliding movement of the carriage.

The end of the carriage 60 nearest the belt-transfer frame 39 may be provided with a pair of vertically opposed frame-engaging members 64, 64, as illustrated in Figures 7 and 8. These frame-engaging members 64, 64 are preferably similar in cross-section to the channel-shaped frame leg portions 42 and 43 and preferably engage the exterior or outermost legs 43 with a sliding fit therebetween.

These frame-engaging members 64, 64 are preferably each provided with the spaced belt-confining projections 65 which serve to confine the belt at all times, and to guide the straight portions 55, 55 of the endless belt 15 into their proper position within the recesses of frame-legs 42 and 43 when the stepped-cone pulleys are brought together. The trough-like frame-engaging members 64, 64, which are rigidly secured to the carriage 60, are preferably of substantial length, so that the belt-transfer frame 39 will not tilt or cock during lateral movement thereof.

The present invention also preferably includes means whereby the belt-transfer frame may be readily and accurately brought into the precise plane of any desired pulley stage without having to estimate or judge the correctness of its position. Thus, means may be provided for releasably arresting the sliding movement of the carriage 60, and therefore the belt-transfer frame 39, at the proper points coincident with the respective pulley stages. Thus, the frame-shifting lever 61 may be provided with a longitudinally slidable bar 66 bearing a dog 67 at its lower end. This dog-bearing bar is preferably constantly urged upwardly by a coiled tension spring 68, interconnecting the pin 69 extending from the longitudinally slidable bar 66, and the pin 70 extending from the lever 61 and through the slot 71 of the bar 66. An arcuately curved stationary dog-arresting member 72 may be notched at suitable intervals along its lower edge, as at 73, to receive the dog 67 as it slides along the lower edge of member 72, and this member 72 may be secured to or formed integrally with the support 59.

The dog 67 may be released or rendered inoperable by downward force exerted upon the upper curved end 74 of the longitudinally slidable bar 66. If desired, a pointer 75 attached to lever 61 may cooperate with a scale 76 which may extend outwardly from the notched member 72. If desired, designations applied to the individual graduations of scale 76 may correspond to the driven-shaft R. P. M. obtainable for the different belt settings (where the driving shaft R. P. M. is known) or the designations applied to these graduations may indicate the velocity ratio corresponding to the associated belt setting, and indeed, these graduations merely may be numbered in succession or even bear no designation whatsoever.

The present invention may further include means for preventing lateral movement of the belt-transfer frame 39 so long as the belt has not fully cleared the stepped-cone pulleys and has not been operatively positioned within said belt transfer frame. Thus, a cylindrical rod 77 may be provided, secured to the motor housing 12 through a supporting bracket 78, and adapted to slide to and fro jointly with the driving motor 12 and the driving pulley 13 as the stepped-cone pulleys are brought together or separated.

The rod 77 preferably is provided with a necked-down portion 79 of reduced cross section which, when disposed within the plane of the apertured carriage plate 80, is adapted to permit the carriage 60 to be slid to and fro along its guide bar 58.

The carriage-plate 80 is preferably provided with a series of apertures 81, 81 corresponding in shape and size to the full cross section of rod 77, sufficient clearance being provided to permit rod 77 freely to slide perpendicularly therethrough as the pulleys are separated or brought together. The relatively large apertures 81, 81 may be interconnected by small slots 82, 82 preferably so dimentioned as to permit the transverse passage therethrough of the necked-down or reduced portion 79 of rod 77, and to prevent the relatively larger full-sized portion of rod 77 from passing transversely therethrough. If desired, the slidable rod 77 may be bevelled at the necked-down portion, as at 83, in order readily to guide the thicker or wider portion of the rod back into the selected large aperture 81 of stationary perforated carriage plate 80.

It will thus be seen that the frame-shifting carriage 60, and therefore the frame 39, are locked against translational movement as long as the wide portion of rod 77 projects through any one of the spaced carriage apertures 81. However, as the driving pulley 13 is advanced toward the driven pulley 14, freeing the belt 15 from these pulleys and positioning it within the belt transfer frame 39, the reduced or necked-down portion 79 of rod 77 advances in synchronism with pulley 13, and when this necked-down rod portion enters the plane of the carriage plate 80, the carriage 60 becomes free to move laterally, and may then be slid to and fro along the carriage guide bar 58.

The apertures 81, 81 are preferably so spaced that the axis of rod 77 will coincide with the center of a different one of these apertures, just as the dog 67 engages a different notch 73, each time the belt has been shifted to the plane of a different pair of pulley stages.

The present invention further contemplates the provision of means whereby the belt-transfer frame 39 may be shifted beyond the plane of the last or outermost pulley stage. Thus, this belt-transfer frame is preferably shiftable outwardly beyond the plane of the last pair of stepped-cone pulley stages, to permit the quick removal of the endless belt from the speed change device for inspection or replacement purposes. An extra carriage-plate aperture 81 and notch 73 may be provided (over and above the number required for the pulley stages) designed to function when the transfer frame is shifted over into such outermost position.

When the belt-transfer frame 39, with the belt 15 operatively positioned therein, has been shifted beyond the outermost ends of the stepped cone pulleys, the belt 15 may be seized by hand and readily extracted from the transfer frame.

In order to insure against unintended shifting of the belt beyond the outermost pulley stages, a carriage stop 84, retained by a wing nut 85, may be provided at the end of the carriage guide-bar 58. In order to extract the belt from the speed change device, all that need be done is to loosen wing nut 85, remove the carriage stop 84, and then manipulate lever 61 to shift the belt-transfer frame 39 over to its outermost position, wherein the belt is disposed beyond the outermost ends of the stepped cone pulleys 13 and 14. The operator's hand may then grasp the now accessible belt and extract it from the belt-transfer frame. This feature, by virtue of which the belt may be quickly and easily replaced, is considered an important, although not essential, feature of the present invention.

Another feature of the present invention concerns the manner in which the belt may be shifted from the plane of one pair of pulley stages to that of another along an angle coincident with the outside slope of the stepped-cone pulleys 13 and 14. Thus, while the belt may be translated in a direction parallel to the axes of the stepped-cone pulleys, yet in the preferred embodiment of the present invention, the belt is "angularly" shifted in a direction generally parallel to the outside slope of the conical stepped-cone pulleys, that is, in the direction of the arrow 86 shown in Figure 4.

The advantages flowing from such "angular" shifting of the belting are manifold. Thus, a shorter belt may be used, since the minimum belt length required is dependent, in part, upon the diameters of the major and minor stages of the stepped-cone pulleys, instead of being dependent upon twice the diameter of the major pulley stage, as would be the case were the belt shifted in a direction parallel to the axes of these pulleys.

Again, the requisite degree of relative movement of the stepped-cone pulleys is minimized, and is less than that which would be required were the belt moved in a direction parallel to the pulley axes by an amount determined by the difference between the radii of the largest and the smallest pulley stages. The required belt slack is accordingly proportionately reduced.

The ends of the belt transfer frame may be wholly or partially supported and guided between the vertically-opposed bracket-arms 46, 46 and 47, 47, which preferably jointly extend outwardly in a direction paralleling the slope of the outer surfaces of the stepped-cone pulleys 13 and 14. Bracket-arms 46, 46 are mounted on the fixed support 18, whereas brackets 47, 47 are associated with the slidable motor carriage 21. These brackets may be formed either integrally with their respective supports, or else formed separately therefrom and suitably connected thereto.

These bracket-arms 46, and 47, may be provided with central elongated slots 50, 51 through which slide the opposite ends of the pairs of spaced vertical guide rods 49, 49.

In operation, when the lever-controlled carriage 60 and associated trough-like frame-engaging members 64, 64 are jointly slid outwardly, and are guided in a direction parallel to the axes of the stepped-cone pulleys 13 and 14 by the carriage guide rod 58, (that is to say, in the direction of the arrow 57 shown in Figure 4), the belt-transfer frame 39, which is longitudinally slidable between the trough-like frame-engaging members 64, 64, will move outwardly in the direction of the arrow 86, which is parallel to the outside slope of the stepped-cone pulleys. In other words, while the frame-engaging members 64, 64 move transversely, the composite frame 39 moves horizontally in an angular direction whose components are respectively parallel and perpendicular to the direction of movement of the frame-engaging members. This angular motion results because the frame guide rods 49, 49 (which are directly connected to the frame halves 40 and 41 through the straps 53) project through the bracket-arm slots 50, 51 and can only travel in the one direction determined thereby.

Return movement of the carriage 60 and associated frame-engaging members 64, 64 shifts the belt-transfer frame 39 in its entirety along the same angular path parallel to arrow 86, but in a reverse direction.

Accordingly, the belt positioned within the belt-transfer frame may be shifted to and fro over the stepped-cone pulleys, sufficient clearance being provided for the belt to just clear the different pulley stages. It is to be noted that this lateral shifting of the belt-transfer frame is permitted only after the pulleys have been moved together and the extensible transfer frame has been telescoped inwardly and has operatively engaged the freed belt.

Once the belt has been laterally transferred to its desired new setting, the crank handle 31 may be rotated, advancing the slidable motor carriage 21 and therefore increasing the distance between the associated pairs of bracket-arms 46 and 47. This relative separating movement of the bracket-arms 46 and 47 is transmitted to the telescopic halves 40 and 41 of the extensible transfer frame 39 through the vertical rod or rods 47, 47 (which are fixedly related to their respectively adjacent frame halves 40 and 41), since the ends of these vertical rods project through the bracket-arm slots 50, 51.

The disclosed embodiment of the present invention may be readily modified to accommodate a plurality of belts operating in parallel side-by-side relation. Thus, in cases wherein more than one belt is utilized to transmit the power from the driving pulley to the driven pulley, as for instance where two or three parallel belts contact a single pulley stage (suitably elongated to accommodate such plurality of belts) the width of the belt-transfer frame 39 may be increased to accommodate such plurality of belts. The plurality of parallel belts then may be jointly shifted from one pulley stage to any other desired pulley stage in the same manner in which the single belt illustrated in the accompanying drawings may be thus shifted. If desired, ridges may be provided along the inner periphery of such widened belt-transfer frame to insure maintenance of the proper spacing between belts.

Figure 9:
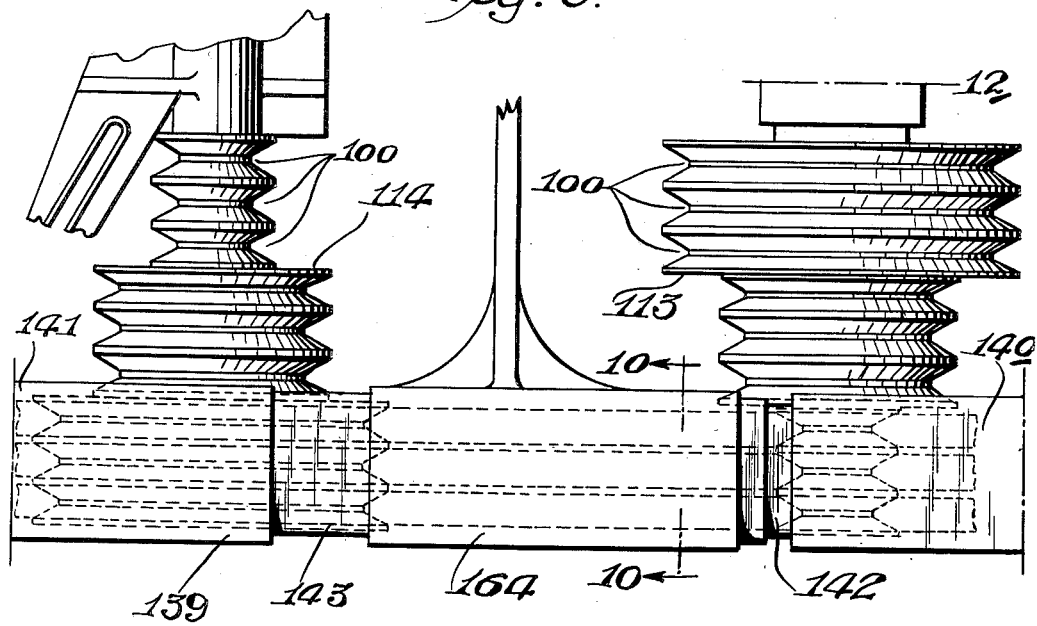
Figure 9 represents a fragmentary plan view of the pulley portion of a speed change device provided with a plurality of parallel V belts.
Figure 10:
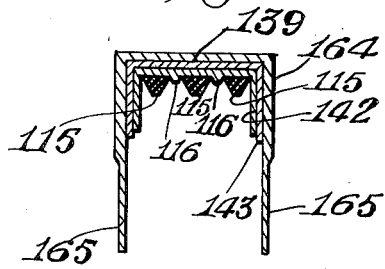
Figure 10 represents a sectional view taken on line 10—10 of Figure 9, looking in the direction of the arrows.

One such modification has been illustrated in Figures 9 and 10, wherein three endless V-belts 115 engage any one pulley stage, in lieu of the single belt 15 formerly provided. Thus, the driving pulley 113 and the driven pulley 114 may each be provided with three steps or stages, each stage being of sufficient over-all width to accommodate the gang of belts 115. Since V-belts are employed, the individual stages or steps are grooved, as at 100, in order properly to receive said belts. The speed change device employing such plurality of belts may, except for the over-all width of the belt transfer frame (indicated generally by the numeral 139), resemble in all respects the hereinabove described device utilizing but a single belt.

The belt transfer frame 139, like the transfer frame 39 of the foregoing embodiment, may consist of two oppositely disposed and telescopically related U-shaped halves 140 and 141 slidably related to each other along their overlapping trough-shaped leg portions 142 and 143, respectively. Frame-engaging members 164, 164, having belt-confining projections 165, may be provided to engage slidably the exterior surface of the transfer frame 139, in order to permit "angular" shifting of the belt or belts, all as more particularly described hereinelsewhere.

The inner periphery of the belt transfer frame 139 may be provided with preferably continuous belt-spacing ridges 116, 116 which serve to maintain the parallel belts 115 in properly spaced relation (corresponding to the spacing of the pulley grooves 100) when the belts have been disassociated from the pulleys and engaged by the belt transfer frame 139. Although the illustrated belt-separating projections 116 project but slightly beyond the inner periphery of the frame 139, it is to be understood that these projections may extend considerably therebeyond, and indeed, if desired, may even equal or exceed in length the belt-confining projections 165. Moreover, the length of the preferably continuous projections 116 need not be uniform, but may vary from point to point.

Figure 11:
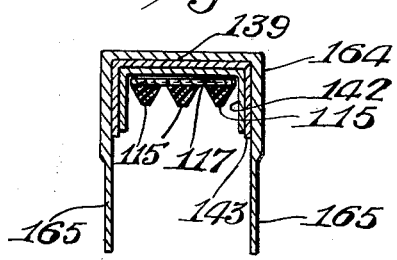
Figure 11 represents a sectional view similar to that shown in Figure 10, but showing a modified belting arrangement.

In the particular embodiment illustrated in Figure 11, the belt spacing projections 116 have been omitted and the three parallel belts 115, instead of being separated from each other as in Figures 9 and 10, are more or less permanently joined or secured together in side-by-side relation by means of the outer preferably fabric layer 117. If desired, the belts 115 and backing layer 117 may be formed integrally with each other, to provide a belt having the advantages of a single belt and the power-transmitting capacity of a plurality of belts.

It will be seen that the velocity ratio between driving and driven shafts may be quickly varied by the disclosed speed-change device without requiring stoppage of the driving shaft 10, and this irrespective of the type of belt or belts employed.

It is to be understood that the entire speed change device may be, and indeed preferably is, encased within a housing which may form an integral part of the housing of the machine tool to which the speed change device is applied. If desired, however, the speed change device may be formed separately therefrom and suitably fastened thereto. The representation of such housing has been omitted from the accompanying drawings for the sake of clarity. Such housing, where provided, preferably includes a readily removable or displaceable access panel which may be disposed generally parallel to the endless belt 15 to permit ready access thereto.

If desired, the carriage movement-limiting stop 84 may be formed integrally with the readily movable, or readily displaceable access panel, so that the operative removal or displacement of said panel will simultaneously render inoperative the stop 84. The carriage 60 may thus be permitted to be shifted into its outermost or belt-removing setting by merely removing or displacing the housing access panel.

If desired, the hereinabove described device may be operated solely as a clutch arrangement, for the velocity-ratio between driving and driven shafts need not be varied each time the belt is disengaged from the stepped-cone pulleys. Thus, the approach and separation of the driving and driven pulleys 13 and 14, accompanied by the simultaneous disengagement and engagement between the endless belt 15 and these pulleys, breaks and makes the connection between the driving and driven members. The load may therefore be applied to, or removed from, rotating driving shaft 10 by turning the motor-advancing crank handle 31 in its proper direction.

The load may readily be applied to, or removed from, the rotating driving shaft 10 in a gradual fashion, thus avoiding subjecting the component parts of the device to undue shocks or strains, and avoiding possible stalling of the prime mover. Thus, assuming that the belt pulleys have been brought together and that the full load has been connected to the non-rotating driven shaft 11, and assuming that driving shaft 10 is continuously rotating, the endless belt 15 may be gradually tensioned over the pulleys 13 and 14 by slowly separating these pulleys. As the contact between the belt and the pulleys increases, the slippage decreases, until eventually the full load has been applied to the driving pulley 13. It is preferably at this point that the releasable locking-block 32 is freed and tilted upwardly, thus locking the motor carriage 21, and therefore driving pulley 13, against return movement.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent, is:

1. A variable-speed power-transmission device comprising a pair of transversely spaced stepped-cone pulleys having the individual stages thereof each grooved to receive a plurality of V belts, a plurality of endless V belts operatively associated with said pulleys, means for increasing and decreasing the distance between said pulleys to bring said belts into and out of operative engagement with said pulleys, and means for shifting said belts jointly into alignment with the respective grooves on any selected pair of cooperating pulley stages, said latter means being operable solely when the distance between said pulleys has been decreased.

2. A variable-speed power-transmission device comprising a pair of transversely spaced stepped-cone pulleys having the individual stages thereof each grooved to receive a plurality of V belts, a plurality of parallel endless V belts operatively associated with said pulleys, means for increasing and decreasing the distance between said pulleys to bring said belts into and out of operative engagement with said pulleys, and means for shifting said belts jointly into alignment with the respective grooves on any selected pair of cooperating pulley stages.

3. In a variable-speed power-transmission device having a pair of relatively transversely movable stepped-cone pulleys operatively interconnected by a plurality of parallel endless V-belts, the individual stages of said stepped-cone pulleys being each grooved to receive said plurality of belts, a laterally shiftable telescopic belt-transfer frame surrounding said plurality of belts and peripherally spaced therefrom, said frame including two telescopic elements each fixedly related to a different one of said relatively movable pulleys.

4. A variable-speed power-transmission device comprising a pair of transversely spaced stepped-cone pulleys having the individual stages thereof each grooved to receive a plurality of V-belts, a plurality of parallel endless V-belts operatively associated with said pulleys, said V-belts being interconnected by a common backing, a laterally shiftable telescopic belt-transfer frame surrounding said V-belts and peripherally spaced from the common backing thereof, and means for simultaneously decreasing the distance between said pulleys and for telescoping inwardly said belt-transfer frame thereby to slacken said belts over said pulleys and to position them operatively in said belt-transfer frame.

5. A variable-speed power-transmission device including a pair of operatively juxtaposed transversely spaced stepped-cone pulleys, the individual stages of said pulleys being grooved, a V-belt operatively interconnecting said pulleys, means for moving one of said pulleys towards the other pulley by an amount sufficient to permit unhindered lateral shifting of said belt over said stepped-cone pulleys, a telescopic belt-transfer frame arranged to engage the outer periphery of said belt when said pulleys are brought together, the telescopic movement of said frame being effected by the relative movement of said pulleys, said belt-transfer frame including means for confining said belt against relative lateral displacement, means for laterally shifting said belt-transfer frame and associated belt over said stepped-cone pulleys into alignment with any desired cooperating pair of pulley stages, and releasable automatic stop means for arresting the lateral movement of said belt-transfer frame at predetermined points corresponding to the several pulley stages.

6. A variable-speed power-transmission device including a pair of transversely spaced stepped-cone pulleys, the individual stages of said pulleys being grooved, a V-belt operatively interconnecting said pulleys, means for decreasing the distance between said pulleys, telescopically adjustable belt-engaging means engageable with said belt when the distance between said pulleys has been thus decreased, the telescopic movements of said belt-engaging means being effected by the relative movement of said pulleys, and means operable solely when the distance between said pulleys has been decreased for laterally shifting said belt-engaging means over the surface of said stepped-cone pulleys into alignment with any desired cooperating pair of pulley stages.

7. In a variable-speed power-transmission device having a pair of transversely spaced stepped-cone pulleys operatively interconnected by a plurality of endless belts, said pulleys being relatively transversely movable, a telescopic belt-transfer frame surrounding said belts and peripherally spaced therefrom, means for simultaneously decreasing the distance between said pulleys and for telescoping inwardly said belt-transfer frame thereby simultaneously to slacken the belts over said pulleys and to position them operatively in said belt-transfer frame, and means for moving said frame sidewise to bring said belts into alignment with any desired pair of pulley stages.

8. In a variable-speed power-transmission device having a pair of transversely spaced stepped-cone pulleys operatively interconnected by an endless belt, said pulleys being relatively transversely movable, a telescopic belt-transfer frame surrounding said belt and peripherally spaced therefrom, means for simultaneously decreasing the distance between said pulleys and for telescoping inwardly said belt-transfer frame thereby simultaneously to slacken the belt over said pulleys and to position it operatively in said belt-transfer frame, and means for moving said frame sidewise to bring said belt into alignment with any desired pair of pulley stages.

9. In a speed change device having a pair of relatively transversely movable stepped-cone pulleys operatively interconnected by a belt, a laterally shiftable telescopic belt-transfer frame for transferring said belt into operative alignment with any cooperating pair of pulley stages, said frame surrounding said belt and including two telescopic elements each fixedly related to a different one of said relatively movable pulleys.

10. A variable-speed power-transmission device including a pair of transversely spaced stepped-cone pulleys, a belt operatively engageable with the different stages of said pulleys, means for varying the distance between said pulleys thereby to slacken or tauten the belt thereover, a belt-transfer frame surrounding said belt and arranged to hold it clear of said pulleys when the belt has been slackened over said pulleys, and means for laterally shifting said belt-transfer frame to and fro over said pulleys to bring said belt into operative alignment with any desired pair of pulley stages, and for shifting said belt-transfer frame beyond the plane of the outermost pulley stages thereby to provide ready access to said belt without hindrance from said pulleys.

11. A variable-speed power-transmission device including a pair of operatively juxtaposed transversely spaced stepped-cone pulleys, a belt operatively engaging said pulleys, means for decreasing the distance between said pulleys by an amount sufficient to permit said belt to clear said pulleys, a telescopic belt-transfer frame surrounding said belt and arranged to telescope inwardly thereover into engagement therewith in synchronism with the relative approach of said pulleys, and means operable solely when said belt is engaged by said belt-transfer frame for laterally shifting said belt-transfer frame and associated belt over said stepped-cone pulleys into alignment with any desired cooperating pair of pulley stages.

12. A variable-speed power-transmission device including a pair of operatively juxtaposed transversely spaced stepped-cone pulleys, a belt operatively engaging said pulleys, means for decreasing the distance between said pulleys by an amount sufficient to permit said belt to clear said pulleys, telescopic belt-engaging means engageable with said belt when the distance between said pulleys has been thus decreased, and means for laterally shifting said belt-engaging means and the associated belt over said stepped-cone pulleys.

13. In a speed change device having an endless belt operatively associated with a pair of spaced stepped-cone pulleys, means for relatively moving said pulleys towards each other to slacken said belt thereover, and means engageable with the thus slackened belt for holding it in spaced relation from and clear of said pulleys, said belt-holding means being laterally shiftable to and fro across the surfaces of said stepped-cone pulleys thereby to position said belt into alignment with any desired cooperating pair of pulley stages.

14. A variable-speed power-transmission device comprising a pair of transversely spaced stepped-cone pulleys, a belt operatively associated therewith, means for increasing and decreasing the distance between the said pulleys to bring said belt into and out of engagement therewith, belt-holding means arranged to hold said belt in spaced relation from and clear of said pulleys when the distance between said pulleys has been decreased, and means for shifting said belt-holding means and associated belt from the common plane of any cooperating pair of stages of said stepped-cone pulleys to the common plane of any other cooperating pair of stages thereof in a direction generally parallel to the exterior slope of said stepped-cone pulleys.

15. A variable-speed power-transmission device comprising a pair of transversely spaced stepped-cone pulleys, a belt operatively associated therewith, means for increasing and decreasing the distance between the said pulleys to bring said belt into and out of engagement therewith, belt-holding means arranged to hold said belt in spaced relation from and clear of said pulleys when the distance between said pulleys has been decreased, and means for shifting said belt-holding means and associated belt from the common plane of any cooperating pair of stages of said stepped-cone pulleys to the common plane of any other cooperating pair of stages thereof.

16. A variable-speed power-transmission unit including a belt operatively associated with a pair of spaced stepped-cone pulleys, means for decreasing the distance between said pulleys by an amount sufficient to permit said belt to be laterally shifted to and fro over said stepped-cone pulleys without hindrance therefrom, belt-shifting means engageable with said belt when said pulleys have been thus brought together for laterally shifting said belt into alignment with any desired cooperating pair of pulley stages, and means preventing lateral movement of said belt-shifting means except when said pulleys have been brought together.

17. A variable-speed power-transmission unit including a belt operatively associated with a pair of spaced stepped-cone pulleys, means for decreasing the distance between said pulleys by an amount sufficient to permit said belt to be laterally shifted to and fro over said stepped-cone pulleys without contacting said pulleys, and belt-shifting means engageable with said belt when said pulleys have been thus brought together for holding said belt clear of said pulleys and for laterally shifting said belt into alignment with any desired cooperating pair of pulley stages.

18. A variable-speed power-transmission device including a pair of operatively juxtaposed transversely spaced stepped-cone pulleys, an endless belt operatively engaging said pulleys, means for decreasing the distance between said pulleys by an amount sufficient to permit said belt to be shifted laterally over said stepped-cone pulleys without contacting said pulleys, self-adjusting means arranged to receive said belt and hold it clear of said pulleys when the distance between said pulleys has been thus decreased, and means for laterally shifting said last-mentioned means over the surfaces of said stepped-cone pulleys.

19. In a variable-speed power-transmission device having a pair of transversely spaced stepped-cone pulleys operatively interconnected by an endless V belt extending into grooves in said pulleys, means for decreasing and increasing the distance between said pulleys, thereby to respectively slacken and tighten said belt thereover, and means for bodily shifting the slackened belt into alignment with any desired cooperating pair of pulley stages without contacting the intermediate pulley stages.

20. A variable-speed power-transmission unit including a belt operatively associated with a pair of spaced stepped-cone pulleys, means for decreasing the distance between said pulleys thereby to slacken said belt, and laterally shiftable means engageable with the thus slackened belt and arranged to hold it clear of said pulleys for subsequent positioning in alignment with any desired pair of cooperating pulley stages.

FREDERICK W. FALTERMAYER.